(12) United States Patent
Pritchard et al.

(10) Patent No.: US 10,711,893 B2
(45) Date of Patent: Jul. 14, 2020

(54) BRAKE FOR UNINTENDED NEUTRAL MODE IN TRANSFER CASE

(71) Applicant: BorgWarner Inc., Auburn Hills, MI (US)

(72) Inventors: Larry A. Pritchard, Macomb, MI (US); Joseph D. Mastie, Belleville, MI (US)

(73) Assignee: BorgWarner Inc., Auburn Hills, MI (US)

( * ) Notice: Subject to any disclaimer, the term of this patent is extended or adjusted under 35 U.S.C. 154(b) by 387 days.

(21) Appl. No.: 15/626,220

(22) Filed: Jun. 19, 2017

(65) Prior Publication Data

US 2017/0363207 A1  Dec. 21, 2017

Related U.S. Application Data

(60) Provisional application No. 62/352,704, filed on Jun. 21, 2016.

(51) Int. Cl.
| | |
|---|---|
| *F16H 63/36* | (2006.01) |
| *B60K 17/344* | (2006.01) |
| *B60K 23/08* | (2006.01) |
| *F16H 61/20* | (2006.01) |
| *B60T 1/00* | (2006.01) |

(Continued)

(52) U.S. Cl.
CPC ........... *F16H 63/36* (2013.01); *B60K 17/344* (2013.01); *B60K 17/3467* (2013.01); *B60K 23/08* (2013.01); *B60T 1/005* (2013.01); *F16D 63/006* (2013.01); *F16H 61/20* (2013.01); *F16H 63/3416* (2013.01); *B60K 5/02* (2013.01); *B60K 2023/0825* (2013.01); *B60Y 2400/405* (2013.01); *B60Y 2400/70* (2013.01); *F16H 2312/04* (2013.01)

(58) Field of Classification Search
CPC .............. B60K 17/344; B60K 17/3467; B60K 17/3465; B60K 23/08; B60K 2023/0891; B60K 2023/0841; F16H 2048/343
See application file for complete search history.

(56) References Cited

U.S. PATENT DOCUMENTS

| | | | | |
|---|---|---|---|---|
| 4,539,859 | A * | 9/1985 | Arai | ........................ F16H 61/24 |
| | | | | 74/473.27 |
| 6,808,053 | B2 * | 10/2004 | Kirkwood | ............ B60K 17/344 |
| | | | | 180/249 |

(Continued)

*Primary Examiner* — Daniel D Yabut
(74) *Attorney, Agent, or Firm* — Young Basile Hanlon & MacFarlane, P.C.

(57) ABSTRACT

A number of variations may include a product comprising an output shaft having a radial flange comprising a plurality of teeth; a range shifter operatively connected to the output shaft constructed and arranged to selectively shift a vehicle between a low range, high range, and neutral mode; a mode shifter operatively connected to the output shaft constructed and arranged to shift the vehicle between a four-wheel and two-wheel drive mode; a dual drive gear operatively attached to the output shaft between the range shifter and the mode shifter constructed and arranged so that rotation of the dual drive gear drives the range shifter and the mode shifter; and at least one plunger radially displaced around the output shaft which is actuated by the dual drive gear to engage a slot between the plurality of teeth on the output shaft to prevent rotation of the shaft during a range shift.

5 Claims, 3 Drawing Sheets

(51) Int. Cl.
*F16H 63/34* (2006.01)
*F16D 63/00* (2006.01)
*B60K 17/346* (2006.01)
*B60K 5/02* (2006.01)

(56) References Cited

U.S. PATENT DOCUMENTS

| | | | |
|---|---|---|---|
| 9,033,842 B2* | 5/2015 | Larkin | B60K 17/344 |
| | | | 475/198 |
| 9,156,351 B2* | 10/2015 | Hasewend | B60K 23/08 |
| 2010/0044138 A1* | 2/2010 | Marsh | B60K 17/348 |
| | | | 180/247 |
| 2017/0028846 A1* | 2/2017 | Takaira | B60K 17/02 |

* cited by examiner

BRAKE FOR UNINTENDED NEUTRAL MODE IN TRANSFER CASE

CROSS-REFERENCE TO RELATED APPLICATIONS

This application claims the benefit of U.S. Provisional Application No. 62/352,704 filed Jun. 21, 2016.

TECHNICAL FIELD

The field to which the disclosure generally relates to includes vehicle powertrains.

BACKGROUND

A vehicle may include a transfer case.

SUMMARY OF ILLUSTRATIVE VARIATIONS

A number of variations may include a product comprising: an output shaft, wherein the output shaft includes a radial flange having a plurality of teeth; a range shifter operatively connected to the output shaft, wherein the range shifter is constructed and arranged to selectively shift a vehicle between a low range mode, a high range mode, and a neutral mode; a mode shifter operatively connected to the output shaft, wherein the mode shifter is constructed and arranged to shift the vehicle between a four-wheel drive mode and a two-wheel drive mode; a dual drive gear operatively attached to the output shaft and interposed between the range shifter and the mode shifter, wherein the dual drive gear is constructed and arranged so that rotation of the dual drive gear drives the range shifter and the mode shifter; at least one plunger radially displaced around the output shaft; and wherein the dual drive gear is constructed and arranged to actuate the at least one plunger during a range shift so that the at least one plunger engages a slot between the plurality of teeth on the radial flange to prevent rotation of the output shaft.

A number of variations may include a transfer case comprising: an output shaft; a range shifter operatively connected to the output shaft, wherein the range shifter is constructed and arranged to selectively shift a vehicle between a low range mode, a high range mode, and a neutral mode; a mode shifter operatively connected to the output shaft, wherein the mode shifter is constructed and arranged to selectively shift the vehicle between a four-wheel drive mode and a two-wheel drive mode; a dual drive gear interposed between the range shifter and the mode shifter, wherein the dual drive gear is constructed and arranged to drive the range shifter and the mode shifter; and at least one plunger radially displaced around the output shaft and operatively connected to and driven by the dual drive gear, wherein the at least one radially displaced plunger is constructed and arranged to engage the output shaft during a range shift to prevent rotation of the output shaft.

A number of variations may include a method for preventing a vehicle from rolling due to an inadvertent range shift comprising: providing a transfer case having an output shaft, a range shifter operatively attached to the output shaft, a mode shifter operatively attached to the output shaft, and a dual drive gear interposed between the range shifter and the mode shifter which is constructed and arranged to drive both the range shifter and the mode shifter; and using a cam surface on the dual drive gear to actuate at least one plunger during a range shift to cause the at least one plunger to engage with the output shaft to ground the output shaft to a shift support preventing rotation of the output shaft.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
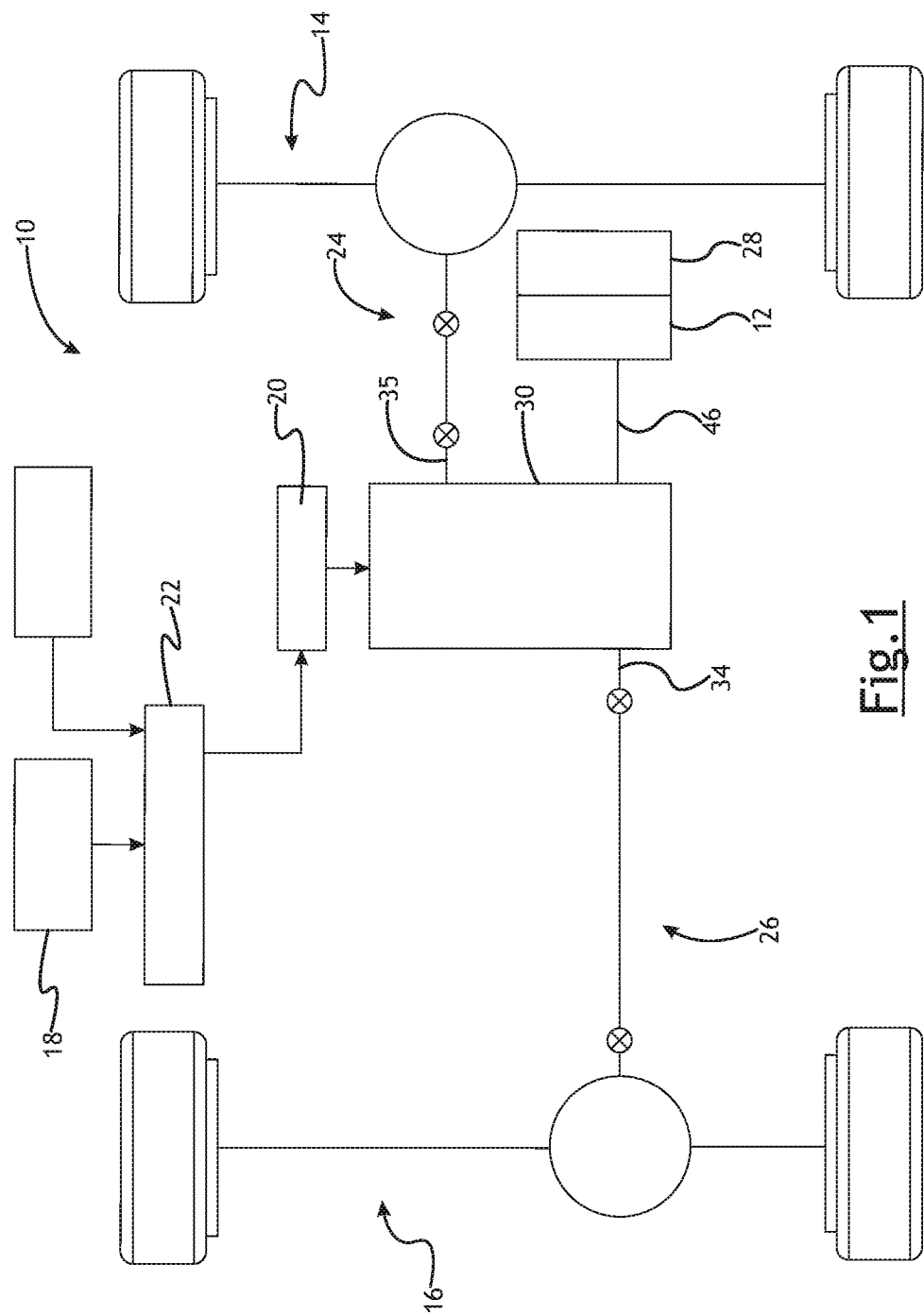
FIG. 1 illustrates a schematic of a vehicle according to a number of variations.

Referring to FIG. 1, in a number of variations, a four-wheel drive or all-wheel drive vehicle 10 may include a transfer case 30 which may receive power from a power transmission device 12 which may convert power from an engine 28 and may transfer the power to the front and/or rear axles 14, 16 so that the vehicle 10 may be selectively driven in a two-wheel drive mode or a four-wheel drive mode. The transfer case 30 may also allow the vehicle 10 to be driven in a low range, high range, or neutral mode. In a number of variations, the transfer case 30 may be manually shifted between the various modes by a shifter or a switch 18, or may be automatically shifted through the use of an electronic control unit (ECU) 22.

Figure 2:
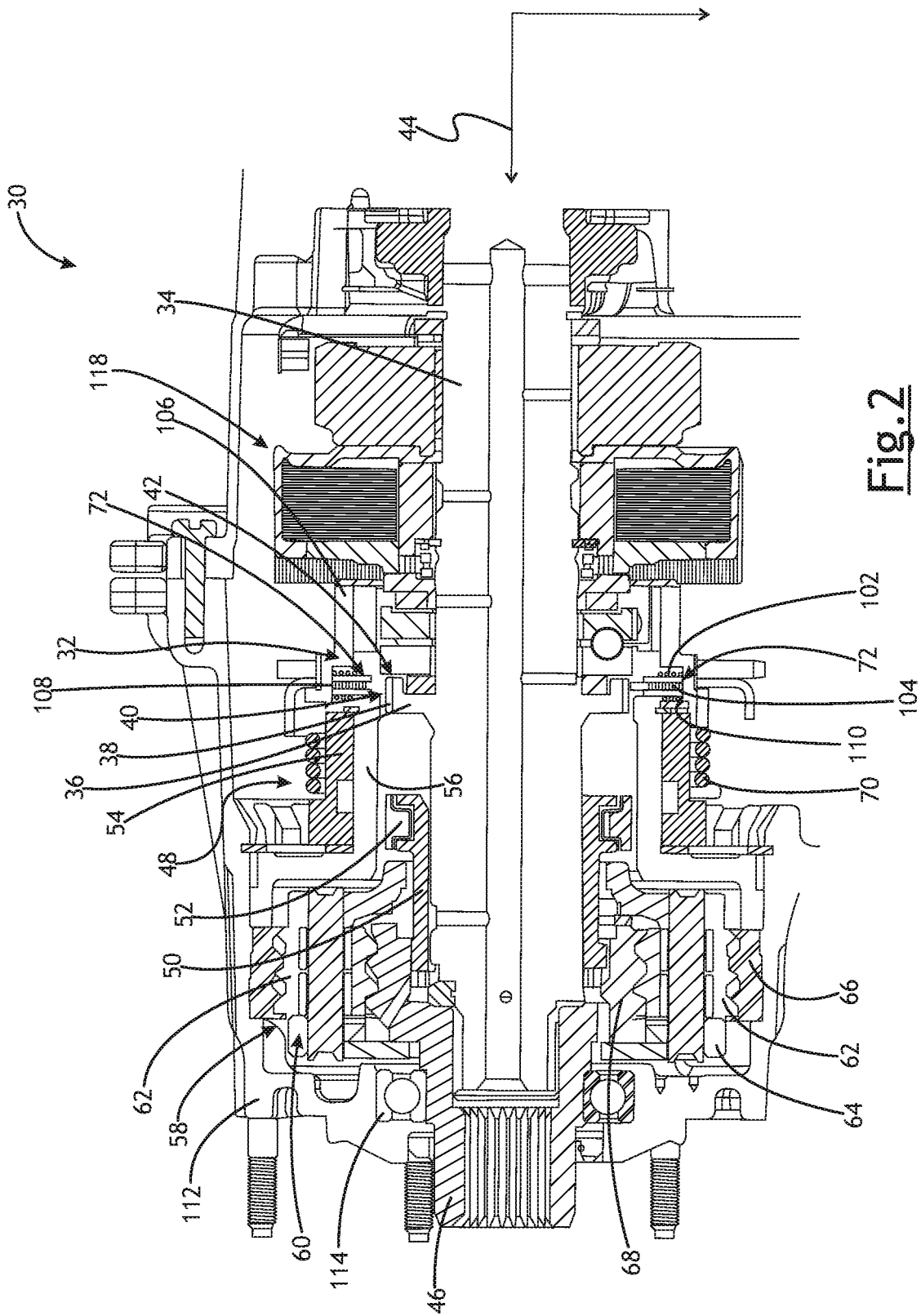
FIG. 2 illustrates a section view of a transfer case according to a number of variations.

Referring to FIG. 2, in a number of variations, a transfer case 30 may include a failsafe feature including, but not limited to, a mechanical brake 32, which may be constructed and arranged to prevent a vehicle 10 from inadvertently entering into the neutral mode through a range shift or an inadvertent range shift. The mechanical brake 32 may be used to restrict rotation of an output shaft 34, 35 operatively connected to the front and/or rear driveline 24, 26 during a range shift so that the vehicle 10 may be prevented from inadvertently entering into a neutral mode and rolling away when a driver is not in control of the vehicle 10.

In a number of variations, a failsafe transfer case 30 may include an output shaft 34 which may rotate around a primary axis 44 and an input shaft 46 which may be coaxial with the output shaft 34 and which may surround a portion of the output shaft 34. In a number of variations, the output shaft 34 may include a radial flange 36 which may include a plurality of teeth 38. A range shifter 48 and a mode shifter 118 may be positioned coaxially around the output shaft 34 and may be spaced longitudinally adjacent from each other, which may allow for the use of fewer off-axis components to perform the shifting functions of the range shifter 48 and the mode shifter 118. A dual drive gear 106 may also be coaxial with the input shaft 46 and may be interposed between the range shifter 48 and the mode shifter 118. In a number of variations, the failsafe transfer case 30 may include a housing 112 which may surround at least a portion of the range shifter 48, the mode shifter 118, and the dual drive gear 106. The housing 112 may also include various seals, recesses, shoulders, flanges, bores, etc. which may be constructed and arranged to position and accept various components of the transfer case 30. In a number of variations, the output shaft 34 may extend within a portion of the housing 112 and may be rotatable within the housing 112. A portion of the input shaft 46 may also extend within the housing 112 and may be rotatably supported within the housing 112 by one or more bearing assemblies 114.

In a number of variations, the dual drive gear 106 may be constructed and arranged so that it may be configured for reversible clockwise and counterclockwise rotation about the primary axis 44 through an angular arc of less than 360 degrees. The dual drive gear 106 may be constructed and arranged so that during a first end portion of angular rotation about the primary axis 44, the dual drive gear 106 engages and operates the range shifter 48 and during a second opposite end portion of angular rotation about the primary axis 44, the dual drive gear 106 actuates the mode shifter 118. The dual drive gear 106 may be driven by any number of gear trains (not illustrated) which may be operatively connected to and driven by a reverse electric motor 20 (illustrated in FIG. 1). In a number of variations, the ECU 22 (also illustrated in FIG. 1) may be operatively connected to the reverse electric motor 20 and may be used to control the rotation of the dual drive gear 106. The range shifter 48 may be used to shift the vehicle 10 between a low-range, high-range, or neutral mode, and the mode shifter 118 may be used to shift the vehicle 10 between a two-wheel drive mode or a four-wheel drive mode.

In a number of variations, the range shifter 48 may include a shift sleeve 50 which may be constructed and arranged to accommodate and be driven by a shift fork 52 which may move axially in response to a barrel cam 54. A shift support 56, which may be grounded to the housing 112, may surround the shift fork 52 and the shift sleeve 50. In a number of variations, the shift support 56 may be a cylindrical element which may support the shift fork 52. The shift support 56 may be constructed and arranged to allow for guided axial movement of the shift fork 52 but to prevent rotational movement of the shift fork 52. The shift fork 52 may slide in an axial direction along the shift support 56 to drive the shift sleeve 50 in response to rotational movement of the barrel cam 54.

In a number of variations, the shift sleeve 50 may be operably connected to the output shaft 34 through a splined connection which may allow for axial movement of the shift sleeve 50 along the output shaft 34. The shift sleeve 50 may also be engageable with a gear reduction assembly 58. The gear reduction assembly 58 may vary the drive power between the input shaft 46 and the output shaft 34. In a number of variations, the gear reduction assembly 58 may include a planetary gear assembly 60 which may include a plurality of planetary gears 62 which may be operatively attached to a gear carrier 64. The plurality of planetary gears 62 may rotate within a ring gear 66 and may be driven by a sun gear 68. When the vehicle 10 is shifted to a low range drive mode, the shift fork 52 may cause the shift sleeve 50 to move axially to a first position to couple the output shaft 34 with the planetary gear carrier 64. When the vehicle 10 is shifted to a high-range drive mode, the shift fork 52 may move the shift sleeve 50 axially to a second position to couple the output shaft 34 with the sun gear 68.

In a number of variations, a torsional wrap spring 70 may surround a portion of the outer circumference of the barrel cam 54 for biasing the barrel cam 54 to follow rotational movement of the dual drive gear 106, which may allow for completion of range shift movement if temporarily blocked due to unmeshed gear teeth engagement during axial movement. The torsional wrap spring 70 may be constructed to follow movement of the dual drive gear 106 and may be loaded with force in either rotational direction of the dual drive gear 106. The loaded force of the torsional wrap spring 70 may urge rotational movement of the barrel cam 54 to follow rotational movement of the dual drive gear 106. When the torsional wrap spring 70 is loaded with force, the torsional wrap spring 70 continually biases the barrel cam 54 in the desired direction of movement until the range shift movement is completed. In a number of variations, the barrel cam 54 may be rotatably biased toward the desired rotational movement by the torsional wrap spring 70, even if axial movement of the shift fork 52 is temporarily blocked while the dual drive gear 106 continues to rotate. If the barrel cam 54 is axially blocked during rotation, the torsional wrap spring 70 may be loaded with rotational energy to bias the barrel cam 54 to move into a desired orientation when the blocked condition ceases. The torsional wrap spring 70 may store energy between the reverse electric motor 20 and the shift fork 52 until the desired range mode shift is completed.

Figure 3:
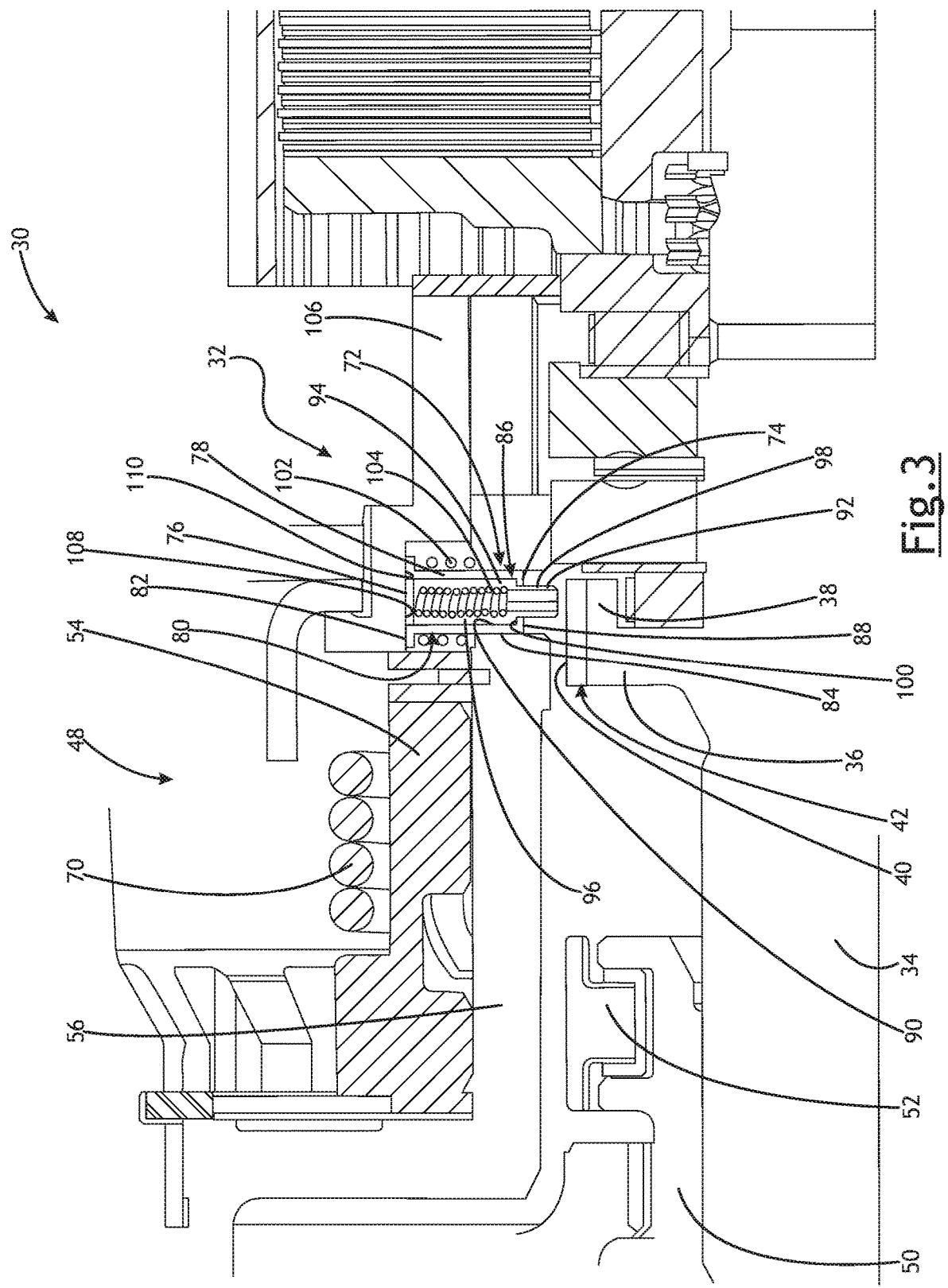
FIG. 3 illustrates a close-up section view of a transfer case according to a number of variations.

In a number of variations, the dual drive gear 106 may include a radial cam surface 108 on the inner diameter 110 of the dual drive gear 106. A first and second radially displaced plunger 72 may be positioned opposite of each other in the transfer case 30 and may be perpendicular to the primary axis 44 so that the plungers 72 may each be aligned with the outer periphery of the teeth 38 on the radial flange 36 of the output shaft 34. The use of two plungers is discussed for illustrative purposes only and it is noted that one or more plungers may be used without departing from the spirit and scope of the invention. The plungers 72 may be operatively aligned with the radial cam surface 108 so that the plungers 72 may be actuated by the radial cam surface 108 when the dual drive gear 106 is rotated during a range shift. Referring to FIG. 3, in a number of variations, the plungers 72 may comprise a first sleeve 74 and a second sleeve 92 which may be coaxial with the first sleeve 74. The first sleeve 74 may be cylindrical and may include a top surface 76 and a body 78 having a first end 80 and a second end 86. The first end 80 may include a radial lip 82 which may extend outward from the outer diameter 84 of the first sleeve 74 and the second end 86 may include a radial lip 88 which may extend outward from the inner diameter 90 of the first sleeve 74. The second sleeve 92 may be cylindrical and may be constructed and arranged to fit within the inner diameter 90 of the first sleeve 74. The second sleeve 92 may include a body 94 having a first surface 96, a second surface 98, and a radial lip 100 extending therebetween. The radial lip 100 may be constructed and arranged to sit on the radial lip 88 on the second end 86 of the first sleeve 74. The second surface 98 of the second sleeve 92 may include a diameter which is less than the diameter of the first surface 96 of the second sleeve 92. A cam follower spring 102 may surround a portion of the first sleeve 74 and may sit against the radial lip 82 on the first end 80 of the first sleeve 74. The cam follower spring 102 may be constructed and arranged to ensure that the plunger 72 follows the radial cam surface 108 during a range shift. The radial cam surface 108 may be eccentric to the output shaft 34 so that when a range shift is initiated, the cam follower spring 102 may compress which may cause the at least one radially displaced plunger 72 to engage the output shaft 34 by entering into a slot 42 between the teeth 38 on the radial flange 36 of the output shaft 34 which may ground the output shaft 34 to the shift support 56 which may prevent rotation of the output shaft 34 and therefore rolling of the vehicle 10 during a range shift.

In a number of variations, the plunger 72 may also include a blocking spring 104 which may be interposed within the first end 80 of the first sleeve 74 so that the second sleeve 92 may be spring-loaded against the first sleeve 74. In a number of variations, if a range shift is initiated and the plunger 72 is not properly aligned with the slot 42 between the teeth 38 on the radial flange 36 of the output shaft 34 such as when the plunger 72 is aligned with the top end 40 of a tooth 38 which prevents the plunger 72 from entering into the slot 42, then the blocking spring 104 may compress and apply a force to the second sleeve 92 so that when the output shaft 34 rotates, the force from the blocking spring 104 causes the second sleeve 92 of the plunger 72 to enter into the slot 42 grounding the output shaft 34 to the shift support 56 and preventing rotation of the output shaft 34. This may prevent the vehicle 10 from rolling away while the vehicle 10 is not properly controlled by a driver.

Referring to FIG. 2, in a number of variations, when the range shifter 48 is in a low-range drive mode or a high-range drive mode, the mode shifter 118 may be actuated to shift the vehicle 10 between the two-wheel drive mode and the four-wheel drive mode. Any number of variations of mode shifters 118 may be used including, but not limited to, a clutch assembly.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: an output shaft, wherein the output shaft includes a radial flange having a plurality of teeth; a range shifter operatively connected to the output shaft, wherein the range shifter is constructed and arranged to selectively shift a vehicle between a low range mode, a high range mode, and a neutral mode; a mode shifter operatively connected to the output shaft, wherein the mode shifter is constructed and arranged to shift the vehicle between a four-wheel drive mode and a two-wheel drive mode; a dual drive gear operatively attached to the output shaft and interposed between the range shifter and the mode shifter, wherein the dual drive gear is constructed and arranged so that rotation of the dual drive gear drives the range shifter and the mode shifter; at least one plunger radially displaced around the output shaft; and wherein the dual drive gear is constructed and arranged to actuate the at least one plunger during a range shift so that the at least one plunger engages a slot between the plurality of teeth on the radial flange to prevent rotation of the output shaft.

Variation 2 may include a product as set forth in Variation 1 wherein the at least one plunger is spring-loaded.

Variation 3 may include a product as set forth in any of Variations 1 and 2 wherein the at least one plunger comprises: a first sleeve; a second sleeve, wherein the second sleeve is constructed and arranged to fit within the first sleeve and is coaxial with the first sleeve; and a blocking spring interposed between the first sleeve and the second sleeve so that the second sleeve is spring-loaded against the first sleeve.

Variation 4 may include a product as set forth in any of Variations 1-3 further comprising at least one cam follower spring operatively attached to the at least one plunger and which is constructed and arranged so that the at least one plunger follows the radial cam surface during the range shift.

Variation 5 may include a product as set forth in any of Variations 1-4 wherein during the range shift the at least one plunger grounds the output shaft to a shift support.

Variation 6 may include a transfer case comprising: an output shaft; a range shifter operatively connected to the output shaft, wherein the range shifter is constructed and arranged to selectively shift a vehicle between a low range mode, a high range mode, and a neutral mode; a mode shifter operatively connected to the output shaft, wherein the mode shifter is constructed and arranged to selectively shift the vehicle between a four-wheel drive mode and a two-wheel drive mode; a dual drive gear interposed between the range shifter and the mode shifter, wherein the dual drive gear is constructed and arranged to drive the range shifter and the mode shifter; and at least one plunger radially displaced around the output shaft and operatively connected to and driven by the dual drive gear, wherein the at least one radially displaced plunger is constructed and arranged to engage the output shaft during a range shift to prevent rotation of the output shaft.

Variation 7 may include a transfer case as set forth in Variation 6 wherein the at least one radially displaced plunger is spring-loaded.

Variation 8 may include a transfer case as set forth in any of Variations 6-7 further comprising at least one cam follower spring operatively attached to the at least one plunger constructed and arranged so that the at least one plunger follows the radial cam surface during the range shift.

Variation 9 may include a transfer case as set forth in any of Variations 6-8 wherein the at least one radially displaced plunger comprises: a first sleeve; a second sleeve, wherein the second sleeve is constructed and arranged to fit within the first sleeve and is coaxial with the first sleeve; and a blocking spring interposed between the first sleeve and the second sleeve so that the second sleeve is spring-loaded against the first sleeve.

Variation 10 may include a transfer case as set forth in Variation 9 wherein the first sleeve includes a top surface and a body having a first end and a second end, and wherein the first end includes a first radial lip extending from an outer diameter of the body and the second end includes a second radial lip extending from an inner diameter of the body, and wherein the second sleeve includes a body having a first surface, a second surface, and a radial lip extending therebetween, and wherein the first surface comprises a first diameter and the second surface comprises a second diameter, and wherein the first diameter is greater than the second diameter; and wherein the blocking spring fits within the first surface of the second sleeve.

Variation 11 may include a transfer case as set forth in any of Variations 6-10 wherein the output shaft includes a radial flange having a plurality of teeth, and wherein the dual drive gear includes a radial cam surface on an inner diameter of the dual drive gear constructed and arranged to actuate the at least one plunger during the range shift so that the at least one radially displaced plunger is pushed into a slot between the plurality of teeth on the output shaft.

Variation 12 may include a transfer case as set forth in any of Variations 6-11 wherein the at least one plunger comprises a first plunger and a second plunger positioned opposite of each other in the transfer case.

Variation 13 may include a transfer case as set forth in any of Variations 6-12 wherein the transfer case is a gear driven transfer case.

Variation 14 may include a method for preventing a vehicle from rolling due to an inadvertent range shift comprising: providing a transfer case having an output shaft, a range shifter operatively attached to the output shaft, a mode shifter operatively attached to the output shaft, and a dual drive gear interposed between the range shifter and the mode shifter which is constructed and arranged to drive both the range shifter and the mode shifter; and using a cam surface on the dual drive gear to actuate at least one plunger during a range shift to cause the at least one plunger to engage with the output shaft to ground the output shaft to a shift support preventing rotation of the output shaft.

Variation 15 may include a method as set forth in Variation 14 further comprising providing a blocking spring in the at least one plunger so that if the at least one plunger is initially prevented from entering the slot, the force from the blocking spring causes the second sleeve to enter into the slot upon rotation of the output shaft.

Variation 16 may include a method as set forth in any of Variations 14-15 further comprising ensuring the at least one plunger follows the cam surface on the dual drive gear with a cam follower spring.

The above description of select variations within the scope of the invention is merely illustrative in nature and, thus, variations or variants thereof are not to be regarded as a departure from the spirit and scope of the invention.

What is claimed is:

1. A product comprising:
an output shaft, wherein the output shaft includes a radial flange having a plurality of teeth;
a range shifter operatively connected to the output shaft, wherein the range shifter is constructed and arranged to selectively shift a vehicle between a low range mode, a high range mode, and a neutral mode;
a mode shifter operatively connected to the output shaft, wherein the mode shifter is constructed and arranged to shift the vehicle between a four-wheel drive mode and a two-wheel drive mode;
a dual drive gear operatively attached to the output shaft and interposed between the range shifter and the mode shifter, wherein the dual drive gear is constructed and arranged so that rotation of the dual drive gear drives the range shifter and the mode shifter;
at least one plunger radially displaced around the output shaft; and
wherein the dual drive gear is constructed and arranged to actuate the at least one plunger during a range shift so that the at least one plunger engages a slot between the plurality of teeth on the radial flange to prevent rotation of the output shaft, wherein the dual drive gear includes a radial cam surface, wherein the at least one plunger comprises a first sleeve and a second sleeve that is coaxial with the first sleeve, the first sleeve being cylindrical and having a top surface and a body having a first end and a second end, the first end having a first radial lip extending outward from an outer diameter of the first sleeve, and the second end having a radial lip which extending outward from an inner diameter of the first sleeve, the second sleeve constructed and arranged to fit within the inner diameter of the first sleeve, the second sleeve including a body having a first surface, a second surface, and a second radial lip extending therebetween, the second radial lip constructed and arranged to sit on the first radial lip on the second end of the first sleeve, the second surface of the second sleeve having a diameter which is less than the diameter of the first surface of the second sleeve, a cam follower spring surrounding a portion of the first sleeve and sitting against the first radial lip on the first end of the first sleeve, the cam follower spring constructed and arranged to ensure that the at least one plunger follows the radial cam surface during a range shift, the radial cam surface being eccentric to the output shaft so that when a range shift is initiated, the cam follower spring compresses causing the at least one plunger to engage the output shaft by entering into a slot between the teeth on the radial flange of the output shaft grounding the output shaft to a shift support to prevent rotation of the output shaft and therefore rolling of the vehicle during a range shift, the at least one plunger including a blocking spring interposed within the first end of the first sleeve so that the second sleeve is spring-loaded against the first sleeve.

2. A transfer case comprising:
an output shaft;
a range shifter operatively connected to the output shaft, wherein the range shifter is constructed and arranged to selectively shift a vehicle between a low range mode, a high range mode, and a neutral mode;
a mode shifter operatively connected to the output shaft, wherein the mode shifter is constructed and arranged to selectively shift the vehicle between a four-wheel drive mode and a two-wheel drive mode;
a dual drive gear interposed between the range shifter and the mode shifter, wherein the dual drive gear is constructed and arranged to drive the range shifter and the mode shifter; and
at least one plunger radially displaced around the output shaft and operatively connected to and driven by the dual drive gear, wherein the at least one radially displaced plunger is constructed and arranged to engage the output shaft during a range shift to prevent rotation of the output shaft, wherein the dual drive gear includes a radial cam surface, wherein the at least one plunger comprises a first sleeve and a second sleeve that is coaxial with the first sleeve, the first sleeve being cylindrical and having a top surface and a body having a first end and a second end, the first end having a first radial lip extending outward from an outer diameter of the first sleeve, and the second end having a radial lip which extending outward from an inner diameter of the first sleeve, the second sleeve constructed and arranged to fit within the inner diameter of the first sleeve, the second sleeve including a body having a first surface, a second surface, and a second radial lip extending therebetween, the second radial lip constructed and arranged to sit on the first radial lip on the second end of the first sleeve, the second surface of the second sleeve having a diameter which is less than the diameter of the first surface of the second sleeve, a cam follower spring surrounding a portion of the first sleeve and sitting against the first radial lip on the first end of the first sleeve, the cam follower spring constructed and arranged to ensure that the at least one plunger follows the radial cam surface during a range shift, the radial cam surface being eccentric to the output shaft so that when a range shift is initiated, the cam follower spring compresses causing the at least one plunger to engage the output shaft by entering into a slot between teeth on a radial flange of the output shaft grounding the output shaft to a shift support to prevent rotation of the output shaft and therefore rolling of a vehicle during a range shift, the at least one plunger including a blocking spring interposed within the first end of the first sleeve so that the second sleeve is spring-loaded against the first sleeve.

3. The transfer case of claim 2 wherein the at least one plunger comprises a first plunger and a second plunger positioned opposite of each other in the transfer case.

4. The transfer case of claim 2 wherein the transfer case is a gear driven transfer case.

5. A method for preventing a vehicle from rolling due to an inadvertent range shift comprising: providing a transfer case having an output shaft, a range shifter operatively attached to the output shaft, a mode shifter operatively attached to the output shaft, and a dual drive gear interposed between the range shifter and the mode shifter which is constructed and arranged to drive both the range shifter and the mode shifter; and using a cam surface on the dual drive gear to actuate at least one plunger during a range shift to cause at least one plunger to engage with the output shaft to ground the output shaft to a shift support preventing rotation of the output shaft and therefore rolling of the vehicle during a range shift, the at least one plunger comprising a first sleeve and a second sleeve that is coaxial with the first sleeve, the first sleeve being cylindrical and having a top surface and a body having a first end and a second end, the first end having a first radial lip extending outward from an outer diameter of the first sleeve, and the second end having a radial lip which extending outward from an inner diameter of the first sleeve, the second sleeve constructed and arranged to fit within the inner diameter of the first sleeve, the second sleeve including a body having a first surface, a second surface, and a second radial lip extending therebetween, the second radial lip constructed and arranged to sit on the first radial lip on the second end of the first sleeve, the second surface of the second sleeve having a diameter which is less than the diameter of the first surface of the second sleeve, a cam follower spring surrounding a portion of the first sleeve and sitting against the first radial lip on the first end of the first sleeve, the cam follower spring constructed and arranged to ensure that the at least one plunger follows the radial cam surface during a range shift, a blocking spring interposed within the first end of the first sleeve so that the second sleeve is spring-loaded against the first sleeve.

* * * * *